(12) United States Patent
Jacobs et al.

(10) Patent No.: US 6,799,251 B1
(45) Date of Patent: Sep. 28, 2004

(54) PERFORMANCE-BASED CACHING

(75) Inventors: Lawrence Jacobs, Redwood City, CA (US); Roger Bamford, Woodside, CA (US); Xiang Liu, San Carlos, CA (US); Shehzaad Nakhoda, Palo Alto, CA (US); Zheng Zeng, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 735 days.

(21) Appl. No.: 09/649,850

(22) Filed: Aug. 29, 2000

(51) Int. Cl.[7] .............................................. G06F 12/12
(52) U.S. Cl. ....................................... 711/133; 711/156
(58) Field of Search ................................ 711/133, 134, 711/136, 159, 139, 144, 145, 154, 156, 160; 709/203, 204, 217, 218, 219

(56) References Cited

U.S. PATENT DOCUMENTS

| | | | | |
|---|---|---|---|---|
| 5,551,001 A | * | 8/1996 | Cohen et al. | 711/122 |
| 5,553,266 A | * | 9/1996 | Metzger et al. | 711/121 |
| 5,822,759 A | | 10/1998 | Treynor | |
| 5,931,904 A | * | 8/1999 | Banga et al. | 341/55 |
| 5,961,601 A | | 10/1999 | Iyengar | |
| 6,507,891 B1 | | 1/2003 | Challenger et al. | |
| 6,553,411 B1 | | 4/2003 | Dias et al. | |

OTHER PUBLICATIONS

Chen et al., Lifetime Behavior and its Impact on Web Caching, Jul. 1999, IEEE Workshop on Internet Applications, pp. 54–61.*

(List continued on next page.)

*Primary Examiner*—Matthew D. Anderson
(74) *Attorney, Agent, or Firm*—Park, Vaughan & Fleming LLP (57) ABSTRACT

A method and system are provided for caching data in a manner that substantially maintains a desired level of system performance. A cache server receives data requests on behalf of a data server. When new data on the data server is generated or stored that replaces or changes data cached on the cache server, the corresponding data on the cache server is invalidated. A subsequent request for the new data may be forwarded to the data server or may be served with the invalid data on the cache server. Determining how to serve the request may depend on a possible impact on system performance and/or one or more characteristics or parameters associated with the requested data. The impact on system performance may be determined by examining actual and/or desired operating conditions (e.g., rate or number of requests, load on the data server, response time to requests, number of open connections, throughput). The data parameters that may be considered may include the popularity of the data; frequency of access to the data; number of accesses; age, size, or type of the data; whether or when a version of the data on the cache server is invalid; how severely invalid the cache server version is; the cost of retrieving the data from the data server; etc. One request received for the new data may be forwarded to the data server in order to receive the new data, cache it and return in to the requester. In order to promote performance, however, any number of requests for new data that is to replace cached data (even a first request received after the cached data is invalidated) may be served with cache data that is responsive but invalid.

40 Claims, 3 Drawing Sheets

OTHER PUBLICATIONS

Jim Challenger, et al. "A Scalable System for Consistently Caching Dynamic Web Data," in Proceedings of IEEE INFOCOM '99, Mar. 1999.

Jim Challenger, et al., "A Publishing System for Efficiently Creating Dynamic Web Content," in IEEE INFOCOM 2000.

Arun Iyengar, et al., "Data Update Propagation: A Method for Determining How Changes to Underlying Data Affect Cached Objects on the Web," Technical Report RC 21093(94368), IBM Research Division, Yorktown Heights, NY, Feb., 1998.

Eric Levy–Abegnoli, et al., "Design and Performance of a Web Server Accelerator," in Proceedings of IEEE INFOCOM '99, Mar. 1999.

Louis Degenaro, et al., "A Middleware System Which Intelligently Caches Query Results," ACM/IFIP Middleware 2000.

Arun Iyengar, et al., "Improving Web Server Performance by Caching Dynamic Data," in Proceedings of the USENIX Symposium on Internet Technologies and Systems, Dec. 1997.

Daniela Rosu, et al., "Hint–based Acceleration of Web Proxy Caches," IPCCC 2000.

* cited by examiner

PERFORMANCE-BASED CACHING

RELATED APPLICATION

This application is related to U.S. application Ser. No. 09/650,498, filed Aug. 29, 2000, entitled "Multi-Tier Caching System."

BACKGROUND

This invention relates to the field of computer systems. More particularly, the invention provides a caching system for serving dynamic data and a method of operating the system to promote a desired level of performance.

Caching systems are often employed to enable faster responses to data requests, especially where the data being requested is stored on a relatively slow device (e.g., disk, tape). A caching system can improve performance by storing all or a portion of the data in a faster device (e.g., random access memory).

Existing caching systems are most suited for those environments in which the requested data is relatively static and/or is not the subject of heavy traffic or usage. In particular, existing systems may provide adequate benefits when the cached data need not be updated on a recurring or regular basis. Unfortunately, such systems are ill-suited to maintaining desired levels of performance when the requested data is dynamic in nature, particularly when the number or frequency of data requests is high. For example, on the Internet an enormous number of users request dynamic content in the form of news stories, financial data, multi-media presentations, etc., and may do so through customized user interfaces containing dynamic components. In particular, many sites or web pages accessed by users contain data that is updated or replaced on a regular basis.

For high-volume, dynamic environments such as the Internet, existing caching systems are not designed to maintain a steady level of performance. Instead, such environments are generally configured to maintain a consistent level of data quality, typically by attempting to always provide the newest or more recent version of requested data. Thus, when a master copy or version of data that is cached is altered or replaced, the version in the cache must be updated or replaced before the faster cache can once again be used to satisfy users' requests. Until the cache is updated, requests for the data must be satisfied from a slower device (e.g., where the master copy is stored). Thus, during heavy periods of traffic or when a large amount of cached data must be replaced, data requests cannot be served from the cache and, unless the web site maintains a sufficient number of alternative, slower, devices to respond to the requests, performance of the web site may decline precipitously.

As a result, a web site operator is faced with a quandary. The operator may employ a sufficient number of slower devices to handle an expected or peak level of traffic, in which case the caching system is superfluous. Or, the operator must be willing to allow performance to be degraded, possibly severely.

Therefore, what is needed is a caching system and a method of operating the caching system in an environment characterized by dynamic data and/or high volumes of data requests, wherein a desired level of performance (e.g., response time to data requests) can be substantially maintained during peak or high traffic periods without obviating the need for the caching system. What is also needed is a method of performance-based caching in which data consistency varies as little as possible.

SUMMARY

In one embodiment of the invention a system and methods are provided for caching data in a manner that promotes a desired level of performance, as measured by response time for data requests, load placed on a system component (e.g., number of open connections), or some other parameter. In this embodiment the consistency of the data provided in response to a request may be allowed to fluctuate, by providing stale data for example, in order to promote the desired level of performance.

According to one embodiment, a caching system comprises a cache for storing copies of data items stored on a data server. The cache may be part of a separate cache server or may be combined with the data server. Generally, data can be provided from the cache server faster than it can be served from the data server. As long as the data in the cache accurately represents the data on the data server, the cached data is served in response to user requests for the data. When contents of the cache become invalid (e.g., stale or obsolete) because corresponding data on the data server changes or is replaced, the cache must receive the updated or replacement data before user requests can receive the new data from the cache server.

In one embodiment of the invention, when a request is received at a cache server for data that has been invalidated, the caching system may first determine whether the present or desired performance of the system (e.g., number of open connections, average or incremental response time, throughput, etc.) allows the request to be passed to the data server that stores an updated or current version of the data. The action taken in response to the request may also depend on factors such as the popularity of the requested data (e.g., how frequently or recently it has been requested) and/or its level of invalidity (e.g., how long ago it was invalidated, the severity of invalidation, when the data was last updated or replaced). Different embodiments of the invention may weigh the operative factors differently.

For example, when a request for data that is invalid on the cache server is passed to the data server because the requested data is popular and/or highly invalid, subsequent requests for the same data may be satisfied at the cache server using an invalid version. Conversely, when less popular and less invalid, but still invalid, data is requested from the cache server, an invalid version of the data may be returned. In addition, however, a lower priority request for an updated or replacement version of the data may be passed to the data server.

In one alternative embodiment of the invention, after a cache entry is invalidated and until replacement data is cached, user requests for the replacement data may be selectively satisfied with invalid data. User requests may, alternatively, be held to await the replacement data or may be passed to the data server for satisfaction. In particular, at least one request for the new or replacement data may be passed to the data server in order to retrieve the data and store it in the cache (in addition to providing it to the requesting user). Subsequent requests may be held by the cache server to wait for the new data or may be satisfied using cache data that was invalidated. The cache server may consider the current performance of the system in determining how to satisfy a request and/or may consider how the system performance would be impacted by passing the request to the data server. In another embodiment of the invention cached data items may be refreshed not only for current, or pending, data requests, but may also be refreshed in anticipation of future data requests.

In one particular embodiment of the invention the currency or validity of a cached data item may depend upon factors such as: a desired level of system performance (e.g., a target response time to user data requests), one or more characteristics of the data item (e.g., how popular it is, the cost of refreshing it, how valuable the data is), and an allowable rate or number of refreshes that may be performed. Depending upon these factors, a particular data request may be satisfied from a cache memory (e.g., even if the cached data item is invalid) or from a data server or other primary storage device.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention.

Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer or a server designed for a central purpose such as caching data. Details of such devices (e.g., processor, memory, data storage, display) may be omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In a previous caching system, a cache is interposed between data requesters and one or more devices (e.g., servers) configured to respond to data requests with a relative slow response time or throughput. The cache is intended to store data from the server(s) and respond to users' requests with greater alacrity. However, in an environment in which the data is relatively dynamic, the cache may require data updates or replacements in order to keep it populated with the most current data. Once a data item on the cache is invalidated or otherwise becomes obsolete, and until it is finally refreshed, data requests must be passed through to a relatively slow server, thus degrading response time and/or throughput. Such a caching system may promote data consistency, but at the expense of performance. In many of today's electronic environments a high and/or sustainable level of performance is required, thus making this type of system unsuitable.

Thus, in one embodiment of the invention a method is provided for operating a caching system that promotes a desired level of performance, which may be measured by response time, request throughput, system load, number of requests or open connections, or some other criterion or factor. The consistency of the data served in response to a data request may be allowed to vary in order to substantially achieve or maintain the desired performance. More specifically, depending on the desired and present performance of the system and the possible or expected effect of whatever action is taken to satisfy the data request, the request may be held to await new or updated data, may be passed to a relatively slow device (e.g., where the new/updated data is available), or may be served with older (e.g., invalid) data. Various performance indicators (e.g., response time, traffic level, processing power) and characteristics of the requested data may be considered in determining what action to take—such as the popularity (e.g., frequency, number or recency of requests for the data), invalidity (e.g., how severely or completely invalid the data is), age, size, type or cost of refreshing or serving the data, etc.

An embodiment of the invention is particularly suited for use in an environment, such as the Internet, where requested data is dynamic and/or a high volume of requests may be received. For example, a web site serving content that is regularly updated or replaced may implement this embodiment in order to maintain a target level of performance even during periods of peak requests or when a large amount of cached data must be replaced or updated.

Although one or more embodiments of the invention are discussed in the context of a widely accessible network such as the Internet and the serving of dynamic content, the invention is not limited to the scope of such embodiments. Other embodiments of the invention may be implemented virtually anywhere a desired level of caching performance is required, such as in a file system, database, etc., regardless of the type of data that is cached or how dynamic it is.

Figure 1:
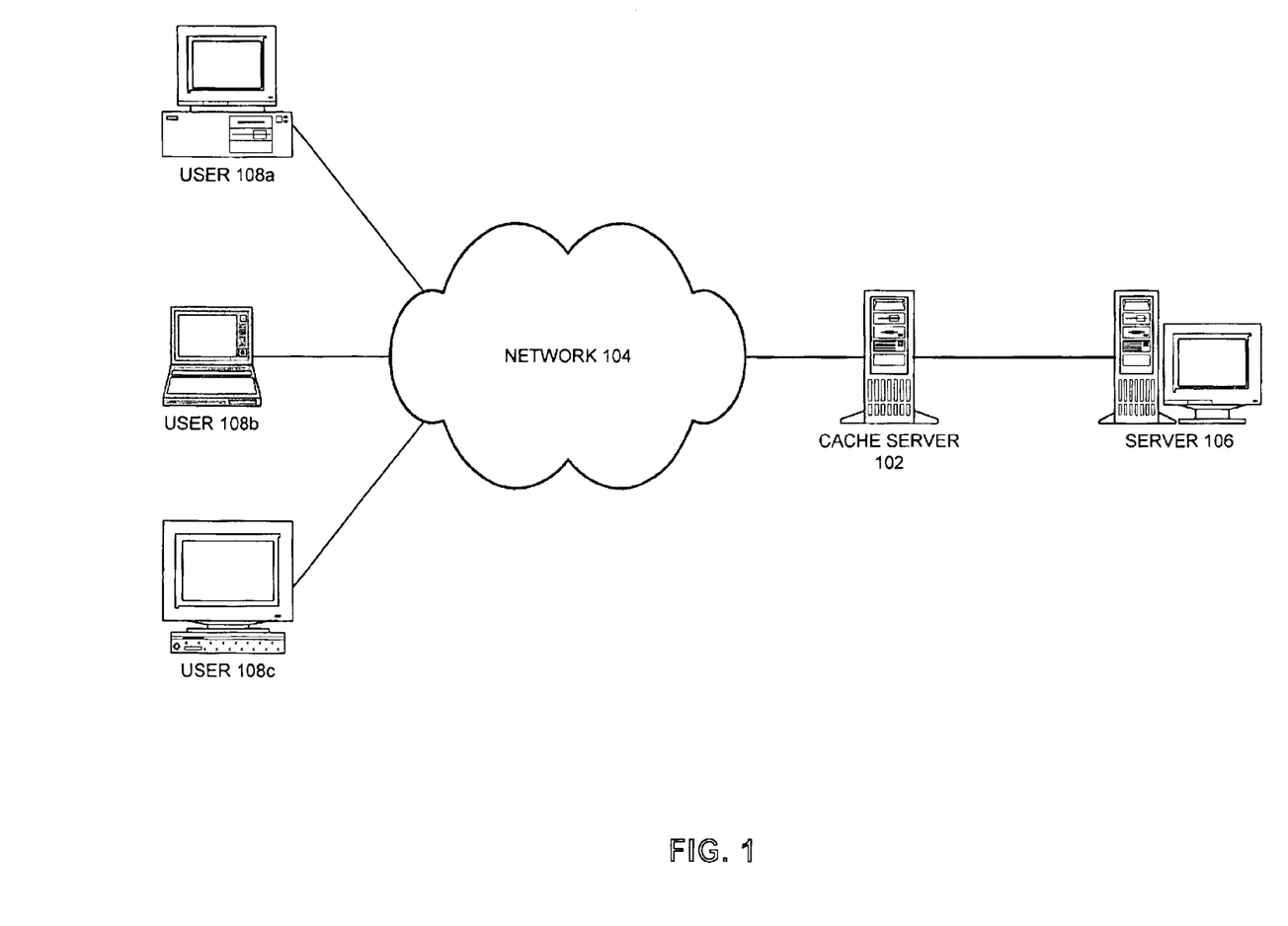
FIG. 1 is a block diagram depicting an electronic environment for caching data in accordance with an embodiment of the invention.

FIG. 1 illustrates an environment in which a caching system according to one embodiment of the invention may be implemented. In FIG. 1, cache server 102 is interposed between network 104 and one or more servers (e.g., web servers, content servers, data servers), such as server 106. Users 108a, 108b, 108c are coupled to network 104, through which they submit requests for content generated by and/or stored on server 106. In this embodiment data served by server 106 may include textual, numerical, multi-media or other types and forms of information suitable for transmission to a user through network 104 and may adhere to any of a variety of protocols or formats (e.g., HTTP, FTP, HTML, XML).

Although cache server 102 is separate and distinct from server 106 in the illustrated embodiment, in another embodiment of the invention one may comprise or be co-located with the other. Also, the medium(s) through which data requests are received and/or satisfied are not limited; thus, the system may include direct or indirect communication links using wired and/or wireless technologies.

In one implementation of this embodiment, cache server 102 and server 106 are operated on behalf of a worldwide web site operating on the Internet. In this implementation one or more of users 108a, 108b, 108c desire access to information served by server 106 and may employ a browser or any other suitable user interface to submit appropriate requests for the information.

In FIG. 1, some subset of data generated or stored on server 106 is copied to cache server 102, from where it can be expeditiously served in response to user requests. Thus, during operation of the system, cache server 102 will often respond to user requests with data stored in a local cache, without involving server 106, but may resort to the content server for new or altered information. During a normal mode of operation (e.g., when data cached on cache server 102 is up to date with corresponding data on server 106), a data request is served or satisfied by the cache server. Depending on whether and how it affects system performance, and possibly other factors (e.g., cost of refreshing a data item, allowed refresh rate, popularity or value of a data item), a request may be sent to server 106 when the cache data is out of date (e.g., obsolete, stale, invalid).

Any particular data item or other information on cache server 102 may be considered or marked valid or invalid. A data item may be considered valid if the data item on server 106 from which it was copied has not been changed, updated or replaced. It may be considered invalid if the original data on server 106 has been changed or replaced. Illustratively, when data is changed or replaced on server 106, a communication may be sent to the cache server to invalidate the corresponding data item(s). Thus, when the cache server receives and caches new data from the server, in a normal mode of operation it may continue serving it in response to user requests until informed that the data is invalid or should be removed or replaced. As described below, however, even after cached data is deemed invalid, it may still be served in response to a user request, depending on system performance and/or the data.

When cache server 102 receives a request for which it has no matching data, either valid or invalid, the request may be passed to server 106. And, when the requested data is sent back from the server, cache server 102 may store it locally (and mark it valid) and forward it to the requesting user.

An operator or administrator of cache server 102 may specify one or more performance characteristics, criteria or indicators to identify a target level of performance for the system, such as throughput (by cache server 102 and/or server 106), response time, maximum or average load or number of connections/requests for a server, etc. The operator may, for example, specify that 95% of user requests should be served within two seconds, meaning that for no more than 5% of user requests should it take longer than two seconds to serve a response. As another example, the operator may specify that server 106 should not be burdened with more than one hundred requests at a time (e.g., data requests, refresh requests), or that the data server should not be burdened with requests to produce pages of content at a rate greater than one hundred pages per second. In different implementations of this embodiment, virtually any criterion that is measurable or that can be applied by cache server 102 may be used to specify a threshold or target level of performance. Yet further, cache server 102 may anticipate receipt of a data request by refreshing a data item (e.g., an invalid item) before a request is actually received.

When cache server 102 receives a request for data that has been marked invalid, the cache server may satisfy the request with invalid (e.g., stale) data, pass the request to server 106 or, in one alternative embodiment, suspend the request to await valid data. The decision to send a request to server 106, or the priority or urgency with which the request is sent may depend on a characteristic of the data, such as its popularity, age, size, type, value, the cost to refresh it, etc. The decision as to whether to pass the request to the data server, and/or the priority with which the request is forwarded, may also depend on how invalid the data is (e.g., how much of the data has changed, how severe the changes are, how long ago the data was deemed invalid, when it was last updated).

In determining how to handle the request, cache server 102 may consider an operating condition of the system that is related to a desired or threshold level of system performance. Therefore, conditions such as the amount of traffic, number or frequency of data requests, number or frequency of requests for the invalid data, load level of server 106, response time of a request passed to server 106, allowed rate for submitting data refreshes or requests to server 106, etc., may be considered.

Thus, if the current operating conditions allow, including the performance of server 106, and/or a characteristic of the data warrants, a request for invalidated data may be passed to server 106, particularly if it is a first or early request for the data after its invalidation. As described previously, when server 106 returns the requested data, cache server 102 will forward it to the requesting user(s) and also cache it for use in serving other requests. Illustratively, any other requests for the invalidated data that are received after one is passed to server 106 may be satisfied with an invalid version of the data or held to await the new/updated data. If, however, a suspended request is held too long (e.g., to the point that a desired performance level may be threatened), then it may be satisfied with the old (i.e., invalidated) data.

Requests passed to the data server for satisfaction may be assigned a level of priority consistent with the popularity, age, invalidity or other characteristic of the requested data. The priority of a request may, however, be dynamically altered.

If an operating condition at the time of a first user request for invalidated data is such that the request cannot be sent to server 106 without having a detrimental effect on the system's performance, or the requested data is not popular or invalid enough to warrant priority service, then a previous or older version of the requested data may be returned to the requesting user. Because the amount of time needed to receive updated data from server 106 will typically be rather short, it should only be on rare occasions that many users are served stale data. In particular, it may be possible that stale data is only, or primarily, served when traffic levels are very high and/or a large amount of cached data has been invalidated. And, as described previously, the system may be biased toward forwarding to the data server requests for popular invalid data and/or data that is considered highly invalid.

Figure 2:
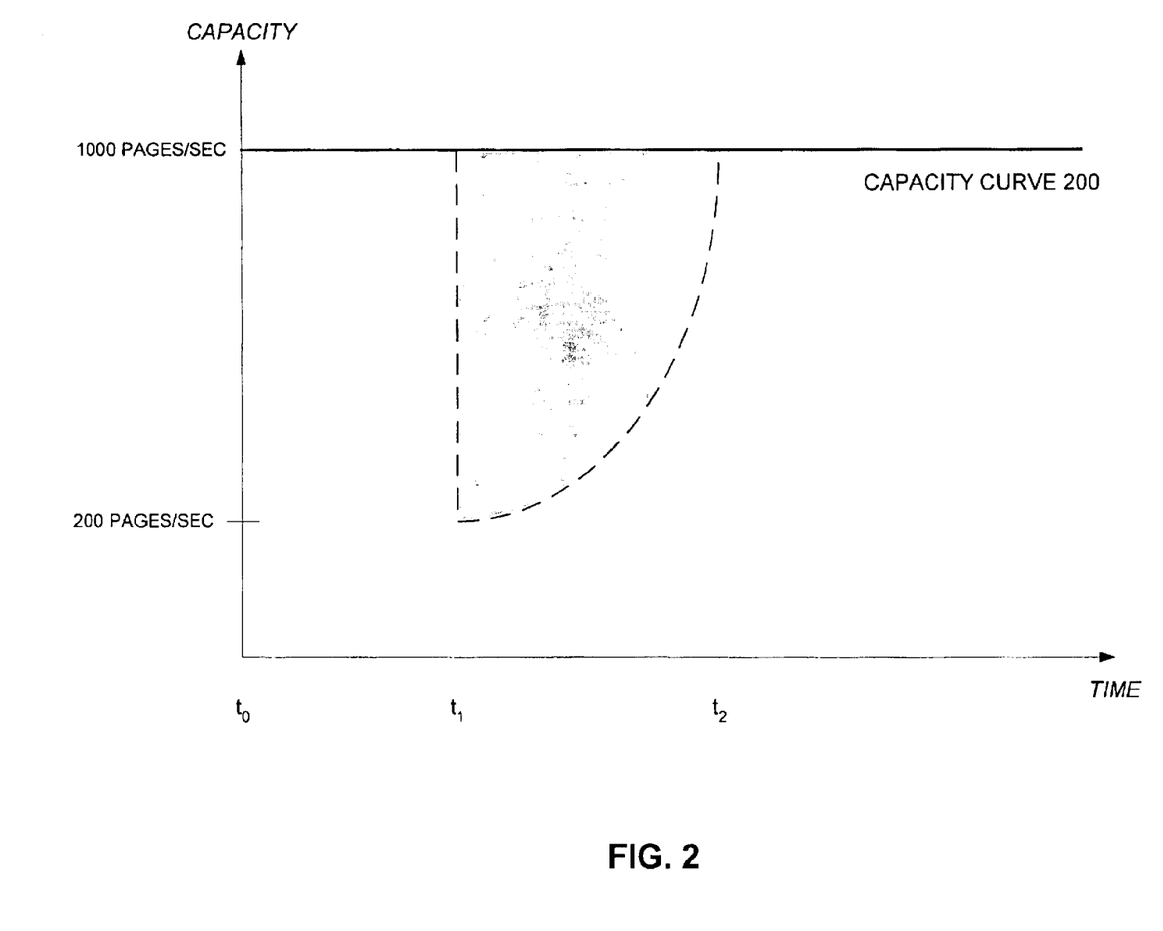
FIG. 2 is a graph depicting the capacity for serving data over time, demonstrating how the capacity may be maintained over time in accordance with an embodiment of the invention.

FIG. 2 depicts an illustrative capacity curve for serving data in the system of FIG. 1 according to one embodiment of the invention. In this illustrative embodiment cache server 102 is capable of serving cached content at a rate of up to 1000 pages per second while, without the cache server, server 106 is capable of serving up to 200 pages of content per second.

Curve 200 of FIG. 2 depicts three relevant time periods. From time $t_0$ to $t_1$, valid copies or versions of data requested by users are stored on cache server 102 and are used to service the requests. At time $t_1$ the data is invalidated and the cache server is not updated until time $t_2$. After time $t_2$, user requests are satisfied with the new cache data.

Between time $t_1$ and $t_2$, previous caching systems may experience a severe reduction in capacity, indicated by the dashed line, as requests for the invalidated data are passed to server 106 and are served at a maximum rate of 200 pages per second. In accordance with a present embodiment of the invention, however, in order to promote desired performance the invalidated data may be served to some or all requesting users during the time $t_1$ to $t_2$. At least one request, however, may be passed through to server 106 in order to retrieve the new or updated data.

In one alternative embodiment of the invention, when cached data is invalidated at time $t_1$, the cache server may initiate a request for replacement data or server 106 may forward the replacement data on its own accord. In this alternative embodiment all users requesting the data may receive the invalidated data until the replacement data is cached. Thus, in this alternative embodiment cache server 102 is updated without waiting for a user request for data that has been invalidated.

The illustrated embodiment of the invention may thus fully or partially eliminate the "trough" of curve 200 that was experienced in previous caching systems. Although system performance may be a primary goal in one implementation of this embodiment, the consistency of the data served is not ignored. In particular, in this embodiment the replacement data may be served in response to user requests as soon as it is cached on cache server 102. This differs from other caching systems that may serve stale data for a pre-determined period of time, in which case data inconsistency suffers needlessly.

Cache server 102 may, in order to promote a desired level of performance, monitor the response rate to user requests, the load on server 106, the number of open connections, one or more characteristics of a cached data item, and any other parameters. The parameter(s) to be monitored in order to determine when or whether to respond to a request with stale data may be specified by a system administrator or operator and/or cache server 102 may apply a learning algorithm to determine what conditions reflect and/or what actions cause decreased performance. Then, when these conditions or actions are encountered, the cache server may serve stale data to avert a decrease in performance.

Figure 3:
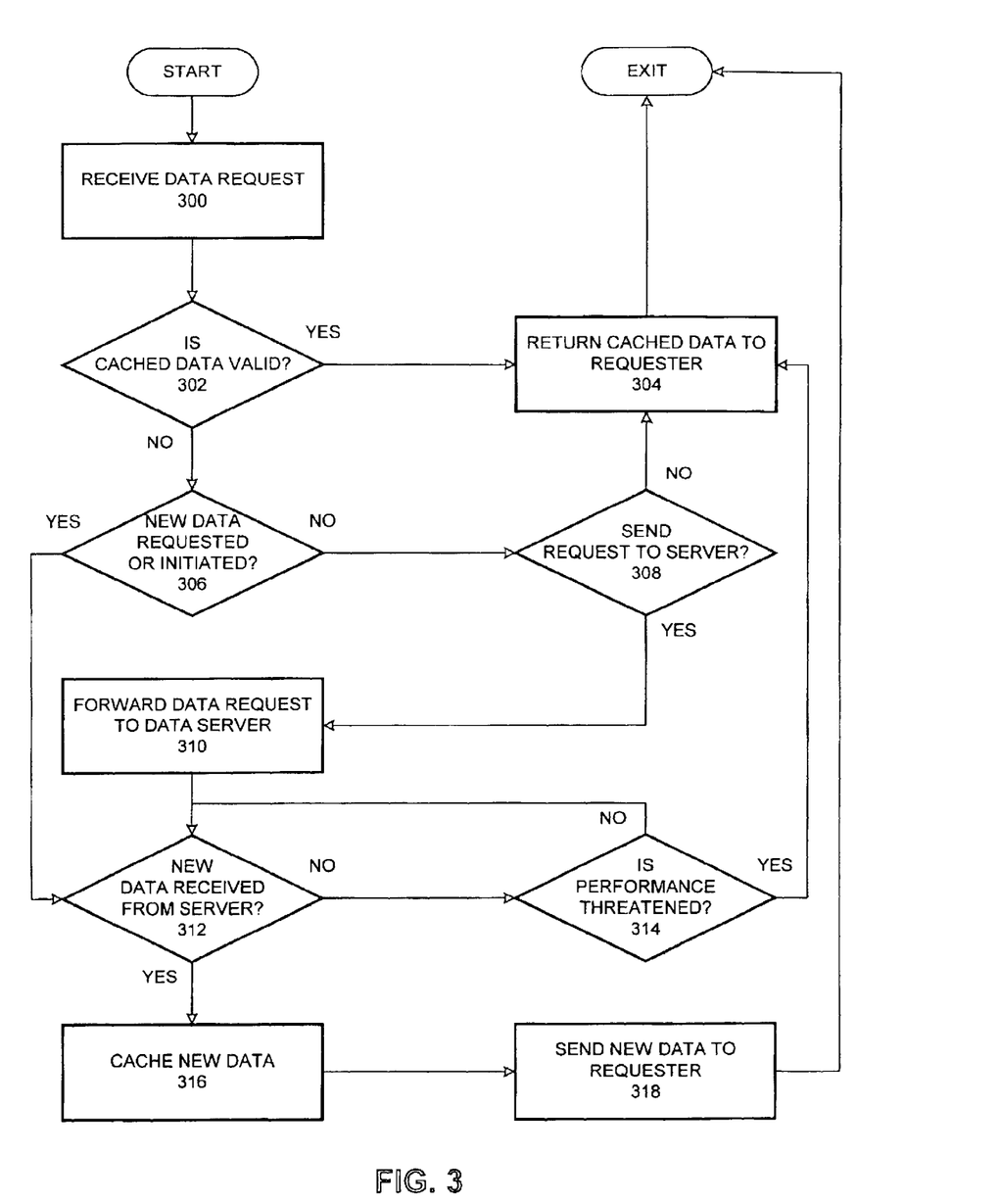
FIG. 3 is a flowchart depicting the operation of a caching system in accordance with an embodiment of the invention.

FIG. 3 demonstrates one method of operating a caching system to substantially maintain a desired level of performance according to a present embodiment of the invention. The illustrated method may be implemented in an electronic environment in which cached data may become obsolete or stale because the data that had been copied into the cache (e.g., from a data server) is updated or replaced. The data that is cached may be of virtually any type, form and size.

FIG. 3 also inherently describes a method of refreshing or updating a cached data item. As discussed above, a cached data item may be refreshed as part of satisfying a current or pending data request, or may be refreshed prospectively, in anticipation of a future data request.

In state 300 of the illustrated procedure, a request for data that is or was stored on a data server and that is or will be cached on a cache server is received at the cache server. The cache server has one or more cache memories. In a cache memory is stored either the requested data or data that is responsive to the request but which has been invalidated (e.g., made obsolete or stale). The cached data may be invalid because a version of the data that is stored on the data server, and which is particularly responsive to the request, has replaced or updated the now-invalid data.

In state 302 the cache server determines whether the cached data that is responsive to the request is valid. Illustratively, when cache data becomes invalid the cache server marks it as such (e.g., when directed by the data server). In one implementation of this embodiment of the invention, the cache server may refresh an invalidated data item, if operating conditions permit, before the next request for the data item. If the cached data is valid, then in state 304 that data is returned to the requester and the procedure ends.

If, however, the cached data is invalid, then in state 306 the cache server determines whether responsive data has been requested from or offered by the data server. Such data may have already been solicited from the data server by previously passing it a user request for the same data. Or, when the cached data was invalidated, the cache server may have automatically requested replacement or updated data, or the data server may have indicated that it will forward the new data. If replacement data has been solicited or initiated, the illustrated procedure advances to state 312 to wait for it; otherwise the procedure continues at state 308. In one alternative embodiment of the invention, after replacement/updated data is requested or initiated, subsequent requests (until the replacement/updated data is received) may be satisfied using an invalid version of the data.

In state 308 the cache server determines whether to forward the present request for the data to the data server. The cache server may decide to forward the request if, for example, it determines that the data server can handle or service the request without decreasing or threatening to decrease the system performance below a desired level. If, for example, a target performance goal is to serve 95% of user requests within two seconds, the cache server may determine whether those guidelines are in danger of being violated if the request is forwarded. In determining whether the desired performance is threatened, the cache server may consider the number of requests currently pending on the data server, a rate at which requests are being or have been received, how much of its cache contents are invalid (and need to be updated/replaced), and/or other factors.

Thus, if the cache server deems that the current burden on the data server is too great to service the request in a timely manner, the request may not be forwarded, even if the present request is the first chance to request the new data. However, in one implementation of this embodiment, where the new or updated data has not yet been requested or initiated there may be a prejudice toward forwarding the request to the data server, particularly if it is the first request (or an early request) received after the responsive cache data is invalidated.

Other factors that may be considered in determining whether to forward the request to the data server include factors concerning the requested data item, such as how old it is, how long ago it was invalidated, how much of the data item is obsolete/stale or how important the changes to the data item are, how often or frequently the data item has been requested or accessed, when it was last accessed, its size, the cost of replacing or updating the data item, etc.

Therefore, in one particular embodiment of the invention, any or all of several factors may determine when (or how often) a data item is refreshed and/or when a data request is passed to a data server rather than being served with invalid data. One factor is a desired or target system performance, such as a desired response time to user data requests.

Another factor is an allowed rate at which data requests and/or refresh requests may be submitted to the data server. Yet another factor focuses upon one or more characteristics of the data item (e.g., popularity, invalidity, age, size, cost of refreshing, value).

If it is decided to forward the request to the data server, the illustrated procedure continues at state 310. Otherwise, the procedure continues at state 304 and returns invalid cached data in response to the request. A situation in which a cache entry is invalidated and a first or early request for the new/updated data is not passed forward to retrieve the data from the server may only occur in rare circumstances—such as when many entries have been invalidated and/or a large number of user requests for the invalidated entry/entries are received. In such a circumstance, because a steady level of performance is desired, it may be preferable to return stale data rather than allow performance to suffer. Also, in this circumstance requests for some invalidated data will still be forwarded to the data server, to the extent that performance considerations allow, even though the present request was not. As invalidated cache entries are replaced or updated, eventually (and likely within a relatively short period of time) data responsive to the present request will be retrieved from the data server (e.g., when a later request for the data is received and forwarded).

In state 310 the data request is forwarded to the data server. The cache server may track the request in order to measure the response time or some other performance measure of the data server. This information may be useful in determining whether a different request can be forwarded to the data server without endangering the desired performance.

In state 312 the cache server awaits the new or updated data from the data server. When it is received, the procedure advances to state 316. The cache server may monitor, collect or generate performance statistics while waiting for the new data. Additionally, in one embodiment of the invention the cache server may respond to requests for the same data that are received while waiting for the new or updated data by serving an invalid version of the data.

Until the requested data is received the illustrated procedure may visit state 314 to determine whether the request should be acted on even without the new data being available. For example, where the desired performance level may be indicated by the time needed to respond to a user request, the cache server may monitor the amount of time a request is pending. If a performance goal is threatened by the duration of the wait, the cache server may jump to state 304 and return stale or invalid data to the requester. The procedure would then exit after state 304. As long as the performance goals/criteria allow, however, the illustrated procedure may cycle through states 312 and 314 to wait for the new data to satisfy the present request.

When the new or updated data is received from the data server, in state 316 it is stored in a cache memory of the cache server. It may or may not overwrite the invalidated data. In state 318 the new data is returned to the requester, after which the illustrated procedure ends.

FIG. 3 illustrates just one method of responding to data requests in a caching system. Other methods of responding to data requests while striving to maintain a desired level of performance may be derived from the illustrated method without exceeding the scope of the invention.

In one particular embodiment of the invention requests for invalid data that are received at a cache server may be segregated according to the popularity, level of invalidity and/or some other characteristic of the invalid data. An initial request for a first type of invalid data—such as a data item that is popular and highly invalid (e.g., as measured by how long ago the data became invalid, the severity of invalidity, how frequently the data server has marked the data item as invalid, the confidence level in a communication ordering the invalidity of the data)—may be assigned a high priority and passed through to the data server for satisfaction. Illustratively, subsequent requests for the same data item are satisfied by the cache server, using an invalid version of the requested data, until replacement or updated data is received from the data server in response to the initial request.

A request for another type of invalid data—such as a data item that is less popular than the first type—may be served by the cache server with an invalid version of the requested data. In addition, though, a lower priority request for the less popular data may be forwarded to the data server. Any method of prioritizing and serving requests may be applied by the data server but, illustratively, in this embodiment all requests having a higher level of priority may need to be served before a request at a lower level of priority is served. The priority of a request may be dynamically modifiable. Subsequent requests for this less-popular data are served with an invalid version of the data until an updated or new version of the data is received by the cache server from the data server.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A computer-implemented method of responding to a data request received at a system for caching data, comprising:

receiving a data request, wherein a first set of data responsive to said request is stored in a first memory and a second set of data responsive to said request is stored in a cache memory; and determining an operating condition of the system, wherein said operating condition comprises a performance characteristic of the system;

based on said operating condition, identifying one of said first set of data and said second set of data to transmit in response to said request; and transmitting said second set of data in response to said request;

wherein said second set of data is obsolete compared to said first set of data; and wherein said performance characteristic comprises an allowable number of data requests that may be served from said first memory.

2. The method of claim 1, further comprising determining a possible impact on said performance characteristic if said first set of data is transmitted in response to said data request.

3. The method of claim 1, further comprising replacing said second set of data with said first set of data.

4. The method of claim 3, wherein said replacing is performed after said transmitting, but before a next data request is received.

5. The method of claim 1, wherein said performance characteristic further comprises a response time to said request.

6. The method of claim 1, wherein said identifying comprises:

determining a characteristic of said requested data; and based on said characteristic and said performance characteristic, identifying one of said first set of data and said second set of data to transmit in response to said request.

7. The method of claim 6, wherein said characteristic comprises a measure of popularity of said requested data.

8. The method of claim 6, wherein said characteristic is one of the set of: size of said requested data, age of said requested data, type of said requested data, value of said requested data, and cost of retrieving said first set of data.

9. The method of claim 6, wherein said characteristic comprises a measure of the invalidity of said requested data.

10. A method of operating a caching system, comprising:

receiving a first request for a data item, wherein a first version of said data item resides in a first memory and a second version of said item resides in a cache memory, and wherein said second version is invalid compared to said first version;

requesting said first version of said data item from said first memory;

receiving a second request for said data item;

determining whether said first version of said data item has been received from said first memory;

serving said second version of said data item in response to said second request; and serving said second version of said data item in response to said first request for said data item.

11. The method of claim 10, further comprising:

determining a possible impact on performance of the caching system of serving said first version of said data item from said first memory in response to said first request.

12. The method of claim 10, wherein said serving said second version of said data item in response to said first request comprises:

determining a characteristic of said data item; and in response to said first request, and depending on said characteristic of said data item, serving one of:

said first version of said data item from said first memory; and said second version of said data item from said cache memory.

13. The method of claim 12, wherein said characteristic is one of the set of: age of said data item, size of said data item, type of said data item, popularity of said data item, recency of a previous request for said data item, cost of retrieving said first version of said data item from said first memory, recency of invalidity of said data item, severity of invalidity of said second version of said data item, and frequency of invalidity of said data item.

14. The method of claim 10, wherein said first memory comprises a portion of a data storage unit of a data server and said cache memory comprises a portion of a data storage device of a cache server, wherein said data server is distinct from said cache server.

15. The method of claim 10, further comprising, prior to said receiving a first request:

receiving said second version of said data item at said cache memory, wherein said second version of said data item was copied from said first memory;

storing said first version of said data item in said first memory to replace said second version of said data item previously stored in said first memory; and invalidating said second version of said data item.

16. The method of claim 10, further comprising:

storing said first version of said data item in said cache memory; and serving said first version of said data item from said cache memory in response to a second request for said data item received after said first request.

17. A method of promoting a desired level of performance in a cache system, the method comprising:

receiving a data request, wherein a first data item responsive to the data request is stored in a first memory and a second data item responsive to the data request is stored in a cache memory;

determining whether said second data item is valid;

determining whether a desired level of system performance is substantially maintainable if said request is served with said first data item from said first memory; and based on said determination of whether said desired level of system performance is maintainable, identifying one of said first data item and said second data item to be returned in response to said data request.

18. The method of claim 17, wherein said first data item is a valid version of said requested data and said second data item is an invalid version of said requested data.

19. The method of claim 17, wherein said system performance comprises a response time to said data request.

20. The method of claim 17, wherein said system performance comprises a number of data requests allowed to be handled by said first memory.

21. The method of claim 17, wherein said system performance comprises a number of refresh requests allowed to be handled by said first memory.

22. The method of claim 17, further comprising identifying a characteristic of said requested data.

23. The method of claim 22, wherein said first data item is a valid version of said requested data and said second data item is an invalid version of said requested data; and wherein said characteristic comprises a popularity of said requested data.

24. The method of claim 22, wherein said characteristic comprises one of: an age of said requested data, a size of said requested data, a type of said requested data, and a cost of retrieving said first data item from said first memory.

25. The method of claim 22, wherein said first data item is a valid version of said requested data and said second data item is an invalid version of said requested data; and wherein said characteristic comprises a level of invalidity of said second data item.

26. The method of claim 17, further comprising:

receiving a second data request; and returning said second data item in response to said second data request.

27. The method of claim 17, further comprising:

receiving a second data request; and postponing said second data request.

28. The method of claim 27, further comprising:

storing said first data item in said cache memory; and returning said first data item in response to the second data request.

29. The method of claim 27, further comprising returning said second data item in response to said second data request.

30. A computer readable storage medium storing instructions that, when executed by a computer, cause the computer to perform a method of operating a caching system, the method comprising:

receiving a first request for a data item, wherein a first version of said data item resides in a first memory and a second version of said item resides in a cache memory, and wherein said second version is invalid compared to said first version;

requesting said first version of said data item from said first memory;

receiving a second request for said data item;

determining whether said first version of said data item has been received from said first memory;

serving said second version of said data item in response to said second request; and serving said second version of said data item in response to said first request for said data item.

31. A caching system for responding to a data request, comprising:

a first memory configured to store a first data item;

a cache memory configured to store a cached data item, wherein said cached data item comprises an invalid version of said first data item;

a communication link configured to receive a first data request from a user; and a processor configured to:
examine an operating condition of the caching system, wherein said operating condition comprises an allowable number of data requests that may be served from said first memory; and
determine, based on said operating condition, whether to return said cached data item in response to the first data request rather than forward the first data request toward said first memory.

32. The caching system of claim 31, wherein said cached data item from said cache memory is returned in response to the first data request.

33. The caching system of claim 31, wherein the first data request is forwarded toward said first memory; and
wherein a second data request received after the first data request is served with said cached data item from said cache memory.

34. The caching system of claim 31, wherein said first data item is received from said first memory, and wherein a second data request received after said first data request is immediately served with said first data item from said cache memory.

35. The caching system of claim 31, wherein the processor is further configured to examine a characteristic of said requested data.

36. The caching system of claim 35, wherein said characteristic is one of the set of: a popularity of said requested data, a level of invalidity of said cached data item, an age of said requested data, a size of said requested data, a type of said requested data, and a cost of retrieving said first data item from said first memory.

37. The caching system of claim 31, wherein said performance characteristic further comprises a desired response time to said data request.

38. The caching system of claim 31, wherein said performance characteristic further comprises a number of open connections on the system.

39. A computer readable medium storing instructions that, when executed by a computer, cause the computer to perform a method of responding to a data request received at a system for caching data, comprising:

receiving a data request, wherein a first set of data responsive to said request is stored in a first memory and a second set of data responsive to said request is stored in a cache memory; and determining an operating condition of the system, wherein said operating condition comprises a performance characteristic of the system;

based on said operating condition, identifying one of said first set of data and said second set of data to transmit in response to said request; and transmitting said second set of data in response to said request;

wherein said second set of data is obsolete compared to said first set of data; and wherein said performance characteristic comprises an allowable number of data requests that may be served from said first memory.

40. A computer readable medium storing instructions that, when executed by a computer, cause the computer to perform a method of promoting a desired level of performance in a cache system, the method comprising:

receiving a data request, wherein a first data item responsive to the data request is stored in a first memory and a second data item responsive to the data request is stored in a cache memory;

determining whether said second data item is valid;

determining whether a desired level of system performance is substantially maintainable if said request is served with said first data item from said first memory; and based on said determination of whether said desired level of system performance is maintainable, identifying one of said first data item and said second data item to be returned in response to said data request.

* * * * *

UNITED STATES PATENT AND TRADEMARK OFFICE
CERTIFICATE OF CORRECTION

PATENT NO. : 6,799,251 B1
DATED : September 28, 2004
INVENTOR(S) : Jacobs et al.

It is certified that error appears in the above-identified patent and that said Letters Patent is hereby corrected as shown below:

<u>Title page,</u>
Item [75], Inventors, replace "Xiang Liu, San Carlos, CA" with -- Xiang Liu, San Mateo, CA --.

Signed and Sealed this

Thirtieth Day of November, 2004

JON W. DUDAS
*Director of the United States Patent and Trademark Office*